Jan. 26, 1960     P. A. KRISTENSEN     2,922,518

TESTING AND SORTING DEVICE FOR MINIATURE CORES

Filed July 16, 1956

INVENTOR.
PAUL A. KRISTENSEN
BY George Sipkin
Edward W. Hughes
ATTORNEYS 2,922,518

TESTING AND SORTING DEVICE FOR MINIATURE CORES

Paul A. Kristensen, Ames, Iowa, assignor, by mesne assignments, to the United States of America as represented by the Secretary of the Navy Application July 16, 1956, Serial No. 598,220

2 Claims. (Cl. 209—72)

This invention relates to magnetic materials testing apparatus and in particular to apparatus for testing miniature magnetic cores.

Small, generally toroidal, magnetic cores made of ferrite and having rectangular hysteresis loops are used in large numbers to provide static memories for electronic computers. The cores used in a given memory system must have uniform magnetic characteristics for the system to work as intended. The most important magnetic characteristic, the hysteresis loss of each core, can be measured; however, to do this it is necessary to complete an energizing winding and a sensing winding around each core. In most cases it is sufficient if each winding consists of a single turn; that is, the energizing and sensing circuits are simply connected through each core as it is tested. The completion of two electrical circuits through a miniature core is quite tedious and difficult, particularly when a large number of cores are to be tested and the dimensions of each core may be of the order of 80 mils outside diameter, 50 mils internal diameter, and they are each 25 mils thick.

It is, therefore, an object of this invention to provide apparatus for testing the magnetic characteristics of miniature magnetic cores.

It is a further object of this invention to provide apparatus for testing the magnetic characteristics of miniature cores and for sorting such cores in accordance with such tests.

It is a still further object of this invention to provide improved means for completing an energizing and a sensing circuit through a miniature toroidal magnetic core.

Figure 1:
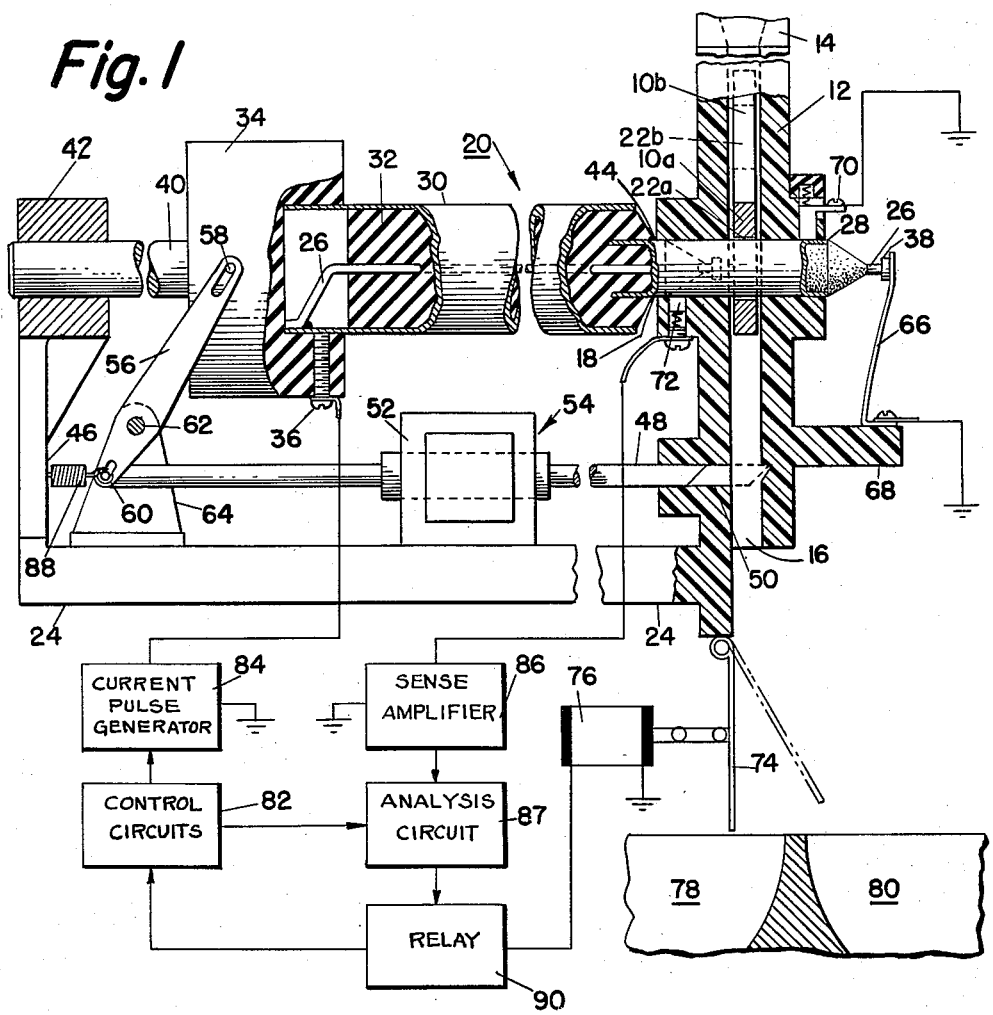
Figure 2:
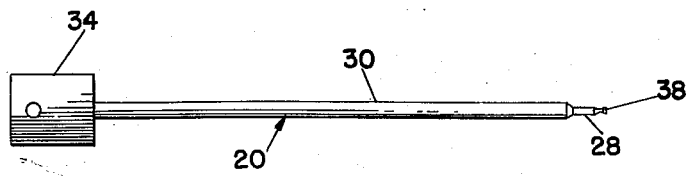

Other objects and advantages of the invention will hereinafter become more fully apparent from the following description of the annexed drawings, which illustrate a preferred embodiment, and wherein:

Fig. 1 is a side elevation of the testing and sorting apparatus greatly enlarged to show details of construction, partly in section, and with parts broken away; and Fig. 2 is a plan view of the probe of the apparatus approximately to full scale.

Referring to Fig. 1 in which an example of the invention is illustrated, the magnetic cores 10a, 10b, etc. are located within vertical chute 12, the upper end of which is connected to a hopper 14. Only the bottom portion of the hopper 14 is illustrated in Fig. 1. Hopper 14 and chute 12 are made of a suitable electrically insulating, transparent, and non-magnetic material such as Lucite. The cross sectional area of passage 16 formed within chute 12 is dimensioned to orient cores 10a, 10b, etc. so that they are in a single vertical row and arranged in edge to edge relationship with one core superposed above the other. As a result of this orientation, probe 20 can pass through the openings 22a, 22b, etc. of each of the cores 10a, 10b, etc. when such openings are aligned with probe 20. Chute 12 is secured to base 24, and base 24 may be mounted on any suitable working surface such as a table top by any suitable means. Probe 20, whose function it is to complete two electrical circuits through each of the cores as the core is tested, has an inner electrical conductor 26. Conductor 26 is mounted within a hollow cylindrical conductor 28. Conductor 28 is mounted in one end of a second hollow cylinder 30, the diameter of which is substantially greater than that of cylinder 28. Conductor 26, conductor 28 and cylinder 30 are mounted with respect to each other so that their longitudinal axes are substantially coincident. Conductors 26, 28 and cylinder 30 are secured together and electrically insulated from each other by a suitable cement 32, such as Glyptal. One end of cylinder 30 is mechanically secured in sleeve 34 which is made of an electrically insulating material by screw 36. Conductor 26 is secured to tube 30 in any suitable manner, such as by crimping, soldering, or welding, so that an electrical circuit exists between the screw 36 and contact 38 which is secured to the forward portion of conductor 26.

Shaft 40 is secured to sleeve 34 so that the longitudinal axis of the shaft 40 is substantially coincident with the longitudinal axes of cylinder 30, cylindrical conductor 28, and inner conductor 26. Probe 20 is mounted for reciprocal motion along its longitudinal axis by guide 42 and opening 44 which is formed in chute 12. The diameter of opening 44 is such that conductor 28 has a sliding fit within it. Guide 42 is fixedly mounted with respect to base 24 by flange 46. Rod, or catch, 48, which retains the cores within the chute 12 until probe 20 has penetrated the central opening of the next core to be tested, is mounted for reciprocal motion parallel to the direction of motion of probe 20 by opening 50 formed in chute 12 and the housing 52 of solenoid 54. Probe 20 and catch 48 are interconnected by arm 56 and lost motion connections 58, 60. Arm 56 is mounted for pivotal movement about pin 62, and pin 62 is fixedly mounted on base 24 by stand 64. A spring biased electrical contact 66 is mounted on bracket 68 which in turn is secured to chute 12 so that contact 66 will engage contact 38 when probe 20 is in its forward position, which position is illustrated in Fig. 1 in solid lines. Spring biased electrical contact 70 is mounted on one side of the opening 16 in chute 12 so as to engage conductor 28 when it is in its forward position, and a similar spring biased electrical contact 72 is mounted on the other side of chute 12 to engage conductor 28, as seen in Fig. 1. Obviously two contacts connected in parallel can be substituted for each of the contacts 70, 72 in order to provide better electrical contact, if desired.

A flap 74 is pivotally secured to one side of chute 12 below opening 50. The position of flap 74 is controlled by solenoid 76. Thus, when flap 74 is in the position shown in solid lines in Fig. 1, a tested core will fall straight down into the satisfactory container 78. When the flap 74 is moved to the position illustrated by the dashed lines in Fig. 1, the falling core will be deflected into the unsatisfactory container 80.

From observing the approximate dimensions of the probe 20, as illustrated in Fig. 2, and the dimensions of a sample core, as stated, supra, it is obvious that the timing and the relative positions of the moving elements are critical. It is, therefore, essential to have a control, or timing source 82, which may be of conventional design, to properly time and sequence the steps necessary in testing and sorting miniature magnetic cores in order to obtain efficient operation. Timer 82 controls current pulse generator 84, analysis circuit 87 and solenoid 54, the latter by conventional circuit means which are not illustrated.

When the probe 20 is in its forward position, as illustrated by the solid lines of Fig. 1, solenoid 54 is not energized. When solenoid 54 is deenergized, spring 88, which is connected between flange 46 and one end of catch 48, retracts the catch 48 the maximum permitted distance; and through the action of arm 56, extends probe 20 the maximum distance forward into the opening 44 through chute 12. When probe 20 is in its forward position, the energizing and sensing circuits are completed. The energizing circuit includes pulse generator 84, screw 36, conductor 26, contact 38 and spring contact 66. The sensing circuit includes amplifier 86, contact 72, conductor 28, and contact 70.

After a sufficient period of time has elapsed after solenoid 54 is deenergized for probe 20 and catch 48 to assume the positions illustrated in solid lines in Fig. 1, the control circuit 82 causes the pulse generator 84 to become operative to produce predetermined magnetomotive forces in core 10a, for example. For each of the pulses produced by generator 84 there is induced in the sensing circuit an electromotive force. These induced electromotive force pulses, or voltage pulses, are amplified by amplifier 86 to a useable value and then applied to analysis circuit 87. If the pulses produced in the sensing circuit are of a proper amplitude and shape, then the magnetic characteristics of core 10a are satisfactory. If the induced voltage pulses fail to fall within satisfactory limits, the core is unsatisfactory and must be rejected.

Analysis circuit 87 may be an oscilloscope which is synchronized with the pulses produced by the current generator 84 and which is observed by an operator. Or, analysis circuit 87 can be an amplitude sensitive electronic circuit of conventional design. If a human operator is used, the limits of the voltages produced by the sensing winding can be indicated on the face of the cathode ray tube of the oscilloscope. Thus, if the traces produced as a result of the energizing pulses lie within the desired limits, the core is satisfactory, and the operator pushes one control button; if the traces produced do not lie within the desired limits, the core is unsatisfactory, and the operator pushes a second control button. If the core 10a is satisfactory, solenoid 76 will not be energized. The act of pushing either of the two control buttons indicates that the analysis is completed and this causes control circuit 82 to start a new cycle of test and evaluation. The first step of the cycle is the energizing of solenoid 54 which moves rod 48 forward into chute 12 and causes probe 20 to withdraw. The location of pivot 62 is chosen so that rod 48 will block opening 16 in chute 12 before the forward portion of probe 20 has been withdrawn sufficiently to permit core 10a to drop. When probe 20 is withdrawn to the position shown in dashed lines in Fig. 1, when it is fully retracted, and rod 48 has moved forward to the position also shown in dashed lines, core 10a will drop down until it strikes the top of catch 48. Core 10b will then drop down the same distance, which distance is such that opening 22b of core 10b will be aligned with opening 44 in chute 12. Timer 82 causes solenoid 54 to be energized for a sufficient period of time for each core in chute 12 to drop a distance equal to its outside diameter, then control circuit 82 causes solenoid 54 to be deenergized. Spring 88 then pushes probe 20 through the next core to be tested and retracts rod 48 so as to unblock opening 16 and let the core tested in the immediately preceding cycle fall into either container 78 or container 80.

It should be noted that because of the different rates of travel between rod 48 and probe 20, due to the location of pivot 62, that probe 20 will have entered a sufficient distance into the opening 22b of the core 10b to keep core 10b in place before core 10a, for example, drops out of chute 12 through opening 16. If the core 10a is unsatisfactory in that the voltages induced in the sensing windings are too great or too small, then the unsatisfactory control button would have been pressed by the operator and solenoid 76 would be energized. The flap 74 will then be moved to the position as shown by broken lines in Fig. 1 to deflect an unsatisfactory core into container 80. Solenoid 76 will remain energized until the satisfactory control button is subsequently pushed, and will remain deenergized until the unsatisfactory button is pushed.

Since the amplitudes of the voltages produced by the sensing circuit are determined by the magnetic characteristics of the core, other parameters being constant, a voltage sensitive circuit can replace and perform the same functions as an operator in determining if each core has the desired magnetic characteristics. This circuit controls relay 90 which in turn controls solenoid 76 and causes control circuit 82 to start a new cycle. If the analysis is performed by an electronic circuit, it is only necessary to have an operator to see that an adequate supply of cores is available in the hopper 14.

Conductor 28 is made as short as possible in order to minimize the capacitance between energizing and sensing circuits. In one example, conductor 26, cylindrical conductor 28, and cylinder 30 were each made of platinum hypodermic stock, so that they were good electrical conductors, and non-magnetic. The diameter of core 26 in one example was 0.012", conductor 28 was .035", and conductor 30 was 0.080". The use of hollow cylinders made of platinum produces a proble having adequate physical strength, together with good electrical and magnetic characteristics.

Obviously many modifications and variations of the present invention are possible in the light of the above teachings. It is therefore to be understood that within the scope of the appended claims the invention may be practiced otherwise than as specifically described.

What is claimed is:

1. Apparatus for use in testing centrally apertured magnetic cores of substantially equal diameter which comprises a chute having opposed sidewalls defining a confined passageway having an upper inlet end for the admission of cores and a lower outlet end for the removal of cores, said passageway being adapted and arranged to permit the cores to pass therethrough by gravity with adjacent cores aligned in peripheral contact, an aperture in each of the opposed walls providing a pair of aligned apertures, a probe including longitudinally extending test conductors and having its front end mounted adjacent one opposed wall for reciprocation in said pair of aligned apertures and transversely of the confined passageway, said one opposed wall having a lower second aperture, a control rod below the probe having its front end mounted adjacent said one opposed wall for reciprocation in said lower second aperture and transversely of the confined passageway, said control rod being operative in its forward movement to interrupt the travel of a lower core through the passageway and to position an upper core with its aperture in alignment with the probe, said probe being operative in its forward movement to pass through the aperture of the upper core and through the pair of aligned apertures, connecting means between the control rod and the probe, said connecting means being operative to move the probe simultaneously with but in the opposite direction to movement of the control rod, a solenoid operative when energized to move the control rod forward, spring means operative to retract the control rod when the solenoid is de-energized and a control circuit for periodically energizing the solenoid in order to periodically advance cores through the passageway for test.

2. Apparatus as in claim 1 further characterized by a second control circuit including elements engaging said conductors when the probe is in its forward position, a second solenoid therein provided with a deflector and operative when energized to deflect a lower core in its movement from the outlet end of the passageway and said probe in combination with said second control circuit being operative at the end of its forward movement to energize the second circuit when a core does not meet a test.

References Cited in the file of this patent

UNITED STATES PATENTS

| | | |
|---|---|---|
| 540,012 | D'Adhemar | May 28, 1895 |
| 2,429,414 | Kuenstler | Oct. 26, 1947 |
| 2,679,025 | Rajchman et al. | May 18, 1954 |
| 2,762,015 | McGrath | Sept. 4, 1956 |
| 2,769,143 | Banzhhof et al. | Oct. 30, 1956 |
| 2,796,986 | Rajchman et al. | June 25, 1957 |

FOREIGN PATENTS

| | | |
|---|---|---|
| 889,130 | France | Sept. 30, 1943 |